INVENTORS
VERLIN A. LAUHER
LOUIS H. FRICKE, JR.

ATTORNEY

United States Patent Office 3,566,282
Patented Feb. 23, 1971

3,566,282
ANALOG CONTROLLER INCLUDING MANUAL PULSE-TRAIN CONTROL
Verlin A. Lauher, Ballwin, and Louis H. Fricke, Jr., St. Louis, Mo., assignors to Monsanto Company, St. Louis, Mo., a corporation of Delaware
Filed June 25, 1968, Ser. No. 739,738
Int. Cl. H03k 5/00
U.S. Cl. 328—127                                       7 Claims

ABSTRACT OF THE DISCLOSURE

An electronic analog controller including comparator amplifier circuitry for comparing the set point value of a process to the process variable. The comparator output signal is coupled to the input of an integrating amplifier circuit, which integrating amplifier provides the desired process load current. A pulse wheel, pulse shaping, and polarity circuitry are employed to generate uniform pulses which are applied to the input of the integrating amplifier when it is desired to manually control the output thereof.

FIELD OF THE INVENTION

The present invention relates generally to electronic controllers, and more particularly to an electronic analog controller whose output, in the manual mode of operation, may be positively and accurately varied by an operator.

BACKGROUND OF THE INVENTION

In the field dealing with process control by means of electronic controllers (for example, chemical processes), it has been the practice to employ a controller including a high-gain amplifier network to which an error signal is applied. The error signal represents the difference between a measured process variable and its desired value. The application of the error signal to the amplifier network and the selection of appropriate feedback parameters therefor cause its output signal to vary as a function of (1) the product of the error signal and the gain of the amplifiers, and/or (2) the derivative of the error signal, and/or (3) the integral of the error signal. This in turn is used to provide the required change in what is commonly referred to as the process loadcurrent; for example, the current used to open or close a valve, thereby to reduce the difference between the measured process variable and the desired "set point" value to substantially zero.

DESCRIPTION OF THE PRIOR ART

Heretofore such an electronic controller has employed an amplifier of the integrating type, whose input is switched between opposite-polarity D.C. voltages by a control operator to raise or lower the process load current, see for example U.S. Pat. 3,290,563 to D. R. Hyer et al. Although this manual control circuit for electronic controllers has served the purpose, it has not proved satisfactory under all conditions of service for the reason that the output of the integrating amplifier provides a rate or "derivative" response, rather than a direct one-for-one response to the action of the control operator.

SUMMARY OF THE INVENTION

The general purpose of this invention is to provide an electronic analog controller which embraces all the advantages of similarly employed electronic controllers, yet does not possess the aforedescribed disadvantage. To attain this, the present invention utilizes a unique pulse generating circuit which may be actuated by an operator to provide a train of fixed-energy pulses to the input circuit of an integrating amplifier. In this manner the output of the integrating amplifier responds directly to the number of input pulses applied to its input, thereby eliminating any tendency of the output to overshoot the desired control voltage.

An object of the present invention is the provision of a novel electronic controller which allows an operator to readily correct or check a process being monitored by the controller.

Another object is to provide an electronic analog controller which, in its manual mode of operation, allows an operator to make facile corrections to a process being monitored.

A further object of the present invention is the provision of an electronic controller which affords an operator manual control of a process and assures that the transfer from manual to automatic modes of operation, or vice versa, is carried out in "bumpless" fashion; that is, transient free switching from automatic to manual mode and vice versa.

In the present invention these purposes (as well as others apparent herein) are achieved generally by providing an electronic controller circuit including an integrator circuit for providing an output signal which is proportional to the integral of the signals applied to its input terminal. Pulse generating circuitry is coupled to the input terminal of the integrator circuit when operating in the manual mode. The pulse generating circuitry produces pulses having a polarity and repetition rate corresponding to that determined by the operator for the purpose of increasing or decreasing the process load current at a desired rate. In this manner the operator directly controls the change in the process load current in a proportional like manner with minimum overshoot of the controlled process.

BRIEF DESCRIPTION OF THE DRAWINGS

Utilization of the invention will become apparent to those skilled in the art from the disclosures made in the following description of a preferred embodiment of the invention as illustrated in the accompanying drawings, in which.

DESCRIPTION OF PREFERRED EMBODIMENTS

Figure 1:
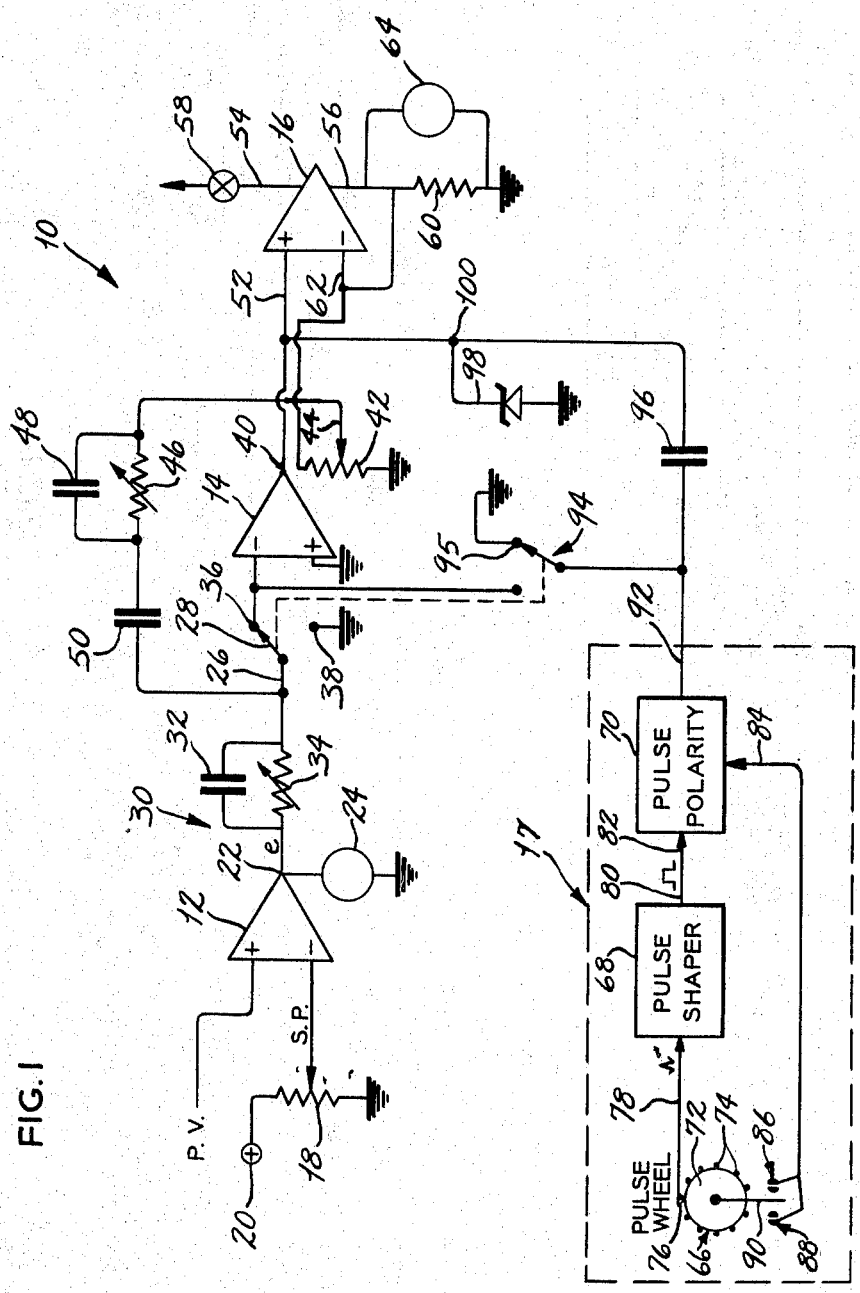
FIG. 1 is a schematic drawing of a preferred embodiment of the electronic analog controller.

Referring now to the drawings, there is shown in FIG. 1 an electronic analog controller, generally designated 10. The controller is shown as consisting of three cascaded amplifier stages 12, 14 and 16 and a pulse generating circuit, generally designated 17. The amplifier stage 12 includes a differential or comparator amplifier characterized by a gain of unity and having its non-inverting (positive) input connected to a sensor (not shown). A typical sensor might be, for example, a flow meter for providing a signal indicative of the value of the fluid flow of a process, i.e. the measured process variable.

The inverting (negative) input terminal of the comparator amplifier 12 is shown connected to the slide of a set point potentiometer 18. One end of the set point potentiometer 18 is connected to a positive reference supply terminal 20, while the other end is connected to ground potential. The set point potentiometer 18 is used by an operator to establish the desired set point for a given process. Comparator amplifiers, such as amplifier 12, are well known operational amplifiers which provide, at their output terminal, a voltage signal corresponding to the difference between the input signals applied to their inverting and noninverting input terminals. Thus, it may be seen that amplifier 12 serves to provide at its output terminal 22 an error signal ($e$), which signal corresponds to the difference between the value of the process variable and that of the desired set point.

A meter 24 is shown connected between the output terminal 22 of the comparator amplifier 12 and ground potential. This meter serves to indicate the value of the error signal ($e$). The output terminal 22 is also coupled to contact 26 of a switch 28 by means of an input resistor-capacitor network, generally designated 30.

The input network 30 consists of a capacitor 32 connected in parallel with a variable resistor 34. Although the resistor 34 is shown as a variable resistor, it should be understood that it (as well as other resistors denoted as variable resistors herein) may take the form of a plurality of fixed, precision resistors which can be switched into or out of the circuit in desired combinations to provide various resistance values.

The switch 28 is shown making contact with an input terminal 36 of the amplifier stage 14. As may be seen, the switch 28 may be selectively actuated to make contact with a grounded terminal 38 for purposes to be described hereinafter. The amplifier stage 14 is a high-gain, D.C. amplifier. Its input terminal 36 is shown coupled by means of the switch 28 to the noninverting (positive) input terminal or conductor 52 of the voltage-to-current transducer amplifier 16, and the inverting input terminal or conductor 62 of amplifier 16 is return to ground through a potentiometer 42. The slide 44 of the potentiometer 42 is coupled to the input terminal 36 by means of a network consisting of the parallel combination of a variable resistor 46 and a capacitor 48; the combination in turn serially connected to a capacitor 50.

The amplifier 16 serves as a current-drive amplifier. That is, it converts a voltage applied to its input terminal 52 into a corresponding current at its output terminals 54 and 56. The current provided at the output terminal 54 is used to drive a transducer 58, for example, a current-to-pneumatic pressure transducer, used in turn to actuate, for example, a valve (not shown). The valve in turn may be used to control the fluid flow which, as suggested hereinabove, is the measured process variable.

The other output terminal 56 of the voltage-to-current transducer amplifier 16 is coupled to ground through a load resistor 60, and in addition is directly connected to the noninverting input 62 of the amplifier 16 for feedback stabilization. In addition output terminal 56 is coupled to the upper end of potentiometer 42. A meter 64 is shown connected across the load resistor 60 to indicate the process load current provided by the voltage-to-current transducer amplifier 16.

The operation of that portion of the electronic amplifier described hereinabove is well known. The comparator amplifier 12 compares the electrical signal representative of the process variable P.V. with that corresponding to the desired set point S.P. and provides at its output terminal 22 an error signal $e$ which is indicated by meter 24. The error signal $e$ is coupled to the input terminal 36 of the high-gain, D.C. amplifier 14 by means of the input network 30. The values of the input resistor 34, input capacitor 32, feedback capacitors 48 and 50, feedback resistor 46, and the resistance provided by the potentiometer 42 are chosen such that the expression for the voltage signal appearing at output terminal 40 in general terms becomes:

$$e_0 = \left[ K \cdot \frac{(R_{34}C_3S+1)}{R_{34}C_3S} \cdot \frac{R_{46}(C_1+C_2)S+1}{R_{46}C_2S+1} \cdot \frac{C_3}{C_1} \right] e$$

where:

$e$ is the error signal appearing at the output terminal 22 of the comparator amplifier 12;

$S$ is the well known Laplace operator; and $K$ is the proportional gain of amplifier 14 as established by the setting of potentiometer 42.

It may be seen from this expression that the electronic controller 10 may be employed to provide any one or any combination of the three basic modes of control, i.e. gain control, integral control, and rate control.

Once the parameters of the input and feedback resistors and capacitors of the amplifier stage 16 are chosen and the system calibrated, control is automatically carried out by the controller 10 in its automatic mode of operation.

The circuitry to be described hereinafter allows an operator to manually vary the process load current of the electronic controller 10 in a positive, accurate manner while operating in the manual mode of operation. Such circuitry is designated the pulse-generating circuit 17 and includes a pulse wheel 66, a pulse shaping circuit 68, and a pulse polarity determining circuit 70.

The pulse wheel 66 consists of a rotatable commutator 72 having along its peripheral edge a plurality of contacts 74. Rotation of the pulse wheel commutator 72 causes the contacts 74 to be brought into contact with a wiper contact 76 at a rate corresponding to the speed of rotation. The commutator contacts 74 are electrically connected to a power supply (not shown) so that make-and-break contact between the wiper arm 76 and any one of the contacts 74 results in the application of a pulse to the input terminal 78 of the pulse shaping circuitry 68.

The pulse shaping circuitry 68 may take the form of a one-shot multivibrator. Preferably the one-shot multivibrator is triggered on the trailing edge of a pulse from the pulse wheel 66 and produces at its output terminal 80, in response thereto, a pulse having a constant voltage ($v$)-pulse duration ($t$) product ($vt$). These "constant area" pulses are delivered to the input terminal 82 of the pulse-polarity-determining circuit 70. Another input terminal 84 of the pulse-polarity-determining circuitry 70 may be selectively connected to two contacts 86 and 88 provided at the pulse wheel 66.

The pulse wheel 66 further includes a movable contact blade 90, which at its upper end is frictionally coupled to the pulse wheel commutator 72 and at its lower end is free to swing between and make contact with either the switch contacts 86 or the contacts 88 as the wheel is rotated in one direction or the other. If the pulse wheel 72 is rotated in the clockwise direction, the frictional coupling of the movable contact blade 90 causes it to be urged to the left as viewed in FIG. 1, so as to make contact with switch contacts 88. Conversely, if the pulse wheel commutator 72 is rotated in the counterclockwise direction the movable contact blade 90 is urged to the right into contact with contacts 86.

One contact of each of the sets of switch contacts 86 and 88 is connected, respectively, to opposite polarity power supply terminals (not shown). In this manner either a positive or negative polarity potential will be applied to the input terminal 84 of the pulse-polarity-determining circuitry 70 as a result of the pulse wheel 72 being rotated in the clockwise or counterclockwise direction. For example, if the pulse wheel 72 is rotated in the clockwise direction, switch contacts 88 are caused to close and a negative potential is applied to the input terminal 84. Conversely, if the pulse wheel 72 is rotated in the counterclockwise direction, switch contacts 86 are caused to close and a positive potential is applied to the input terminal 84 from the positive power supply (not shown) connected to one contact of the switch contacts 86.

The pulse-polarity-determining circuitry 70 is designed such that the pulse applied to input terminal 82 in effect gates the signal applied to the input terminal 84. That is, a negative pulse is provided at output terminal 92 if the switch contacts 88 have been closed by the pulse wheel 72, or a positive pulse is provided if the switch contacts 86 have been closed by the pulse wheel 72. Although the operation just described has been limited to the generation of a single pulse, it should be understood that in actual practice, the operator controlling the direction and speed of rotation of the pulse wheel 72 will cause one or a plurality of pulses to be generated depending on the control situation to which he is responding.

The output terminal 92 of the pulse-polarity-determining circuitry 70 is coupled to the input terminal 36 of the high-gain D.C. amplifier 14 by means of a double-pole, single-throw switch 94. The switch 94 may be switched between the input terminal 36 of the amplifier 14 and the grounded terminal 95. It is mechanically ganged with the switch 28, which switches the error signal between the input terminal 36 and ground potential.

The output terminal 92 of the pulse-polarity-determining circuitry 70 is also coupled to the output terminal 40 of the operational amplifier 14 by means of a coupling capacitor 96. A Zener diode 98 couples the output terminal 40 to ground potential.

OPERATION

The operation of our novel electronic controller 10 may best be illustrated by observing the result of switching it from its automatic mode of operation to its manual mode, and manually controlling the process load current by means of the pulse generating circuitry 17.

Figure 2:
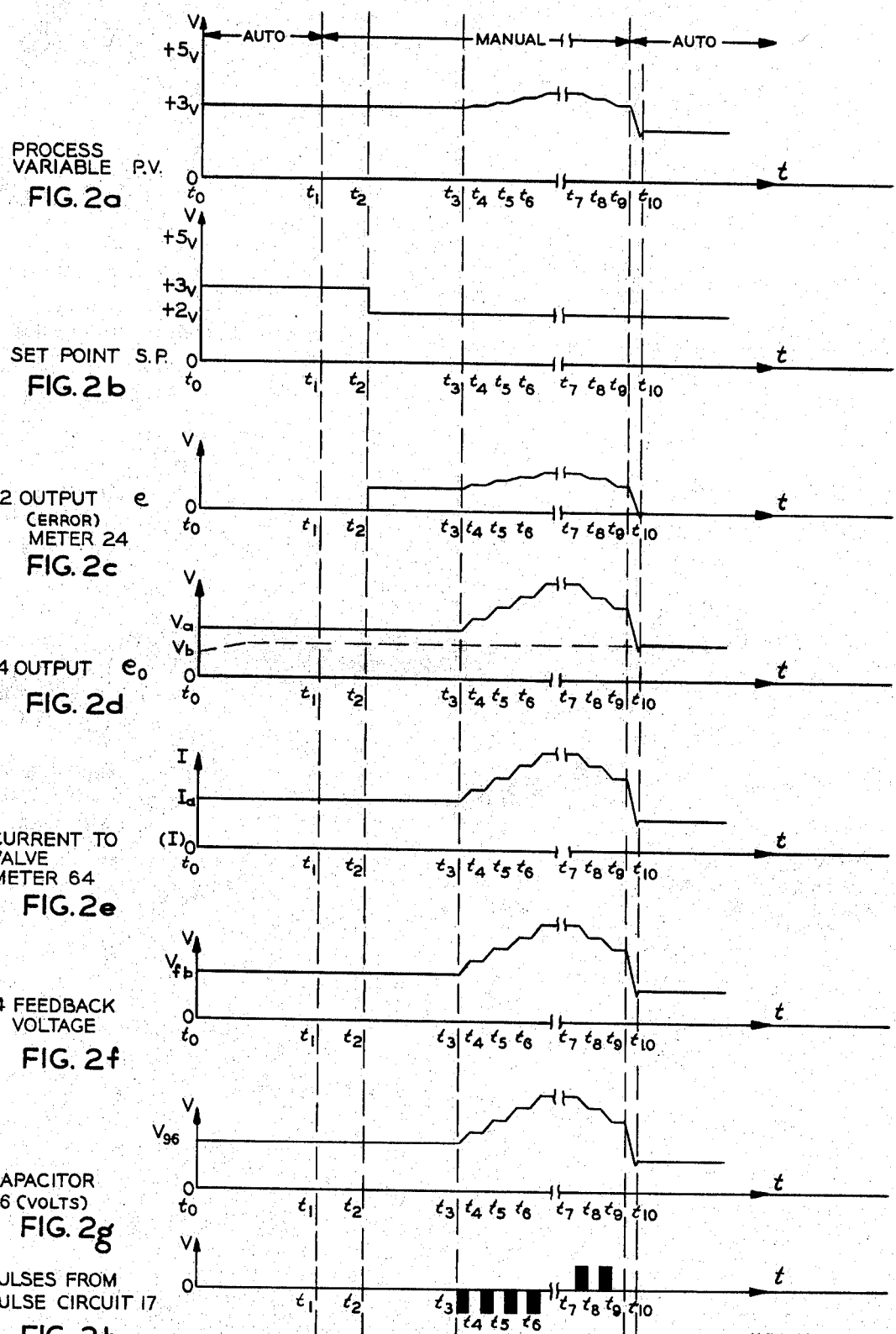
FIGS. 2a–2h are graphical representations of signals occurring at selected points of the controller circuitry as the controller switches from its automatic mode of operation to the manual mode, wherein the operator manually controls the output voltage applied to the process load.

Referring now to FIG. 2 assume that the measured process variable P.V. and the set point S.P. are equal at say +3 volts as shown in FIG. 2a and FIG. 2b at time $t_0$. This means that the error signal $e$ appearing at the output terminal 22 of comparator amplifier 12 (indicated by the meter 24) is zero at time $t_0$ (FIG. 2c). Under these conditions the voltage at the output terminal 40 of the operational amplifier 14 and the corresponding current at the output terminal 54 of the current-driven amplifier 16 are assumed to be at some initial value $V_a$ and $I_a$, respectively (see FIG. 2d and 2e). The value of this voltage $V_a$ and current $I_a$ is such that the transducer 58 provides a pneumatic pressure signal which holds the process variable P.V. at the setpoint value S.P. of +3 volts.

With the electronic controller 10 in its automatic mode of operation the gang switches 28 and 94 are in the positions shown in FIG. 1. In this condition the feedback voltage $V_{fb}$ (FIG. 2f) and the voltage $V_{96}$ (FIG. 2g) across the capacitor 96 follow the output voltage of the operational amplifier 14 and are shown in FIG. 2 as being substantially identical thereto.

At time $t_1$ the electronic controller 10 is switched from its automatic mode of operation to its manual mode of operation. At a later time $t_2$, the setpoint S.P. is switched from +3 volts to a +2 volts by adjusting the slide of potentiometer 18. Since the measured process variable P.V. does not change instantaneously, this results in an error signal $e$ (1 volt) at output terminal 22 of the comparator amplifier 12, as shown in FIG. 2c. The switching of the electronic controller 10 to its manual mode of operation results in switch 28 contacting the grounded terminal 38. Therefore, the error signal so produced does not affect the output of the operational amplifier 14. The input to the operational amplifier 14 has been simultaneously switched by means of switch 94, so that its output is fed back to its input terminal 36 by means of capacitor 96. Thus, the switch from the automatic mode of operation to the manual mode of operation is "bumpless."

Assume that at time $t_3$ an operator rotates the commutator 72 of the pulse wheel 66 in the clockwise direction. This results in the generation of the negative polarity pulses shown in FIG. 2h and occurring at times $t_3$, $t_4$, $t_5$ and $t_6$. It should be noted that these pulses have "constant-area"; that is, they have a constant voltage ($v$)-time duration ($t$) product. They are generated in the manner hereinabove described with reference to the operation of the pulse generating circuitry 17. Assuming that the operational amplifier 14 has a negative gain, these four negative input polarity pulses applied to the input terminal 36 of the operational amplifier 14 causes its output voltage to step upward as shown in FIG. 2d at times $t_3$, $t_4$, $t_5$ and $t_6$. Thus, the process load current $I_a$ is increased accordingly, as well as the feedback voltage $V_{fb}$ across the feedback network of the operational amplifier 14. Furthermore, the voltage across capacitor 96 tracks the output voltage of the operational amplifier 14, as shown in FIG. 2g.

It should ge noted that the increase in the process load current $I_a$ as shown in FIG. 2e results in an increase in the measured process variable P.V. as shown in FIG. 2a. If the operator desires to lower the process load current $I_a$, and therefore the resulting measured process variable P.V., he may then rotate the pulse wheel in the counterclockwise direction, thereby generating the positive polarity, "constant-area" pulses shown in FIG. 2h as occurring at times $t_7$ and $t_8$. These positive polarity pulses are applied by means of switch 94 to the input terminal 36 of the operational amplifier 14 causing it to lower its output voltage. This results in stepping down the process load current and consequently the measured process variable P.V., as shown in FIG. 2.

If at time $t_9$ the electronic controller is switched back to its automatic mode of operation the measured process variable P.V. will be greater than the initial +3 volts since more negative polarity pulses were applied by means of the pulse generating circuitry 14 than positive polarity pulses. Furthermore, it should be remembered that the set point had been changed to +2 volts shortly after switching the electronic controller 10 to its manual mode of operation. Therefore, the error signal $e$ shown in FIG. 2c will be applied to the input terminal 36 of the operational amplifier 14 at time $t_9$. This error signal $e$ drives the output voltage of the operational amplifier to a new value $V_b$ corresponding to the new setpoint S.P. value of +2 volts. The process load current $I_a$ and measured process variable P.V. are changed correspondingly until the error signal $e$ is reduced to zero at time $t_{10}$. The time required for the system to settle out to the new control values and the amount of overshoot are controlled by the settings of the input and feedback impedances of the operational amplifier 14.

It should be noted that the switching from the automatic to the manual mode of operation and vice versa are carried out in a bumpless fashion because the feedback voltage to operational amplifier 14 and the voltage across the capacitor 96 continuously track the output voltage of the operational amplifier 14. Furthermore the Zener diode 98 connected to the output terminal 40 of the operational amplifier 14 limits the range of the output voltage to that desired for control purposes. For example, the value of the Zener diode may be chosen so as to limit the range of this output voltage between 1 and 5 volts.

Figure 3:
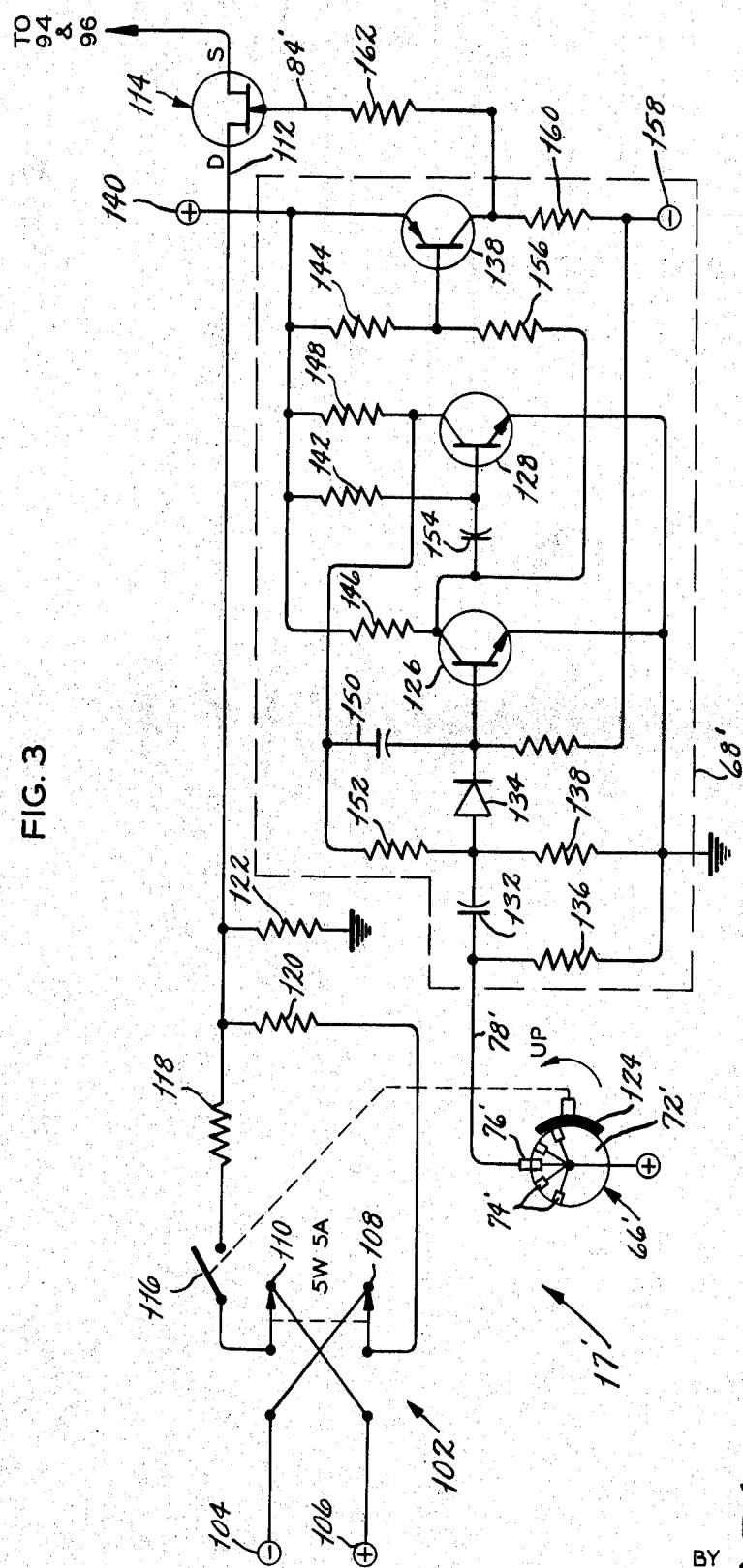
FIG. 3 is a circuit schematic of a preferred embodiment of the pulse generating circuitry of the present invention.

A more detailed circuit schematic of a preferred embodiment of the pulse generating circuitry 17 is shown in FIG. 3. Instead of employing two sets of switch contacts 86, 88, the pulse generating circuitry 17' of FIG. 3 employs a double-pole, single-throw switch 102 which couples positive and negative power supply terminals 104 and 106 to contact terminals 108 and 110, respectively. The contact terminal 110 is coupled to the drain electrode 112 of a field effect transistor 114 by means of a switch 116 and a resistor 118. The contact terminal 108 is similarly connected to the drain electrode 112 of the field effect transistor 114 by means of a resistor 120.

In addition the drain electrode 112 of the field effect transistor 114 is coupled to ground potential by a resistor 122.

As indicated by the dashed line the switch 116 is mechanically coupled to a friction-bearing member 124, which in turn makes contact with the pulse wheel 66'. The friction-bearing member 124 opens and closes switch 116 in response to the counterclockwise and clockwise rotation of the pulse wheel 66', respectively.

The pulse shaping circuitry 68' of FIG. 3 is shown as consisting of three transistors 126, 128 and 130. The base electrode of transistor 126 is coupled to the pulse wheel 66' by means of a capacitor 132 and a diode 134, poled in the direction indicated. The emitter electrodes of transistors 126 and 128 are directly coupled to ground potential, and each side of the capacitor 132 is coupled to ground potential by means of resistors 136 and 138.

The base electrodes of transistors 128 and 130 are coupled to a positive reference potential terminal 140 by means of resistors 142 and 144, respectively, while the collector electrodes of transistors 126 and 128 are coupled to the same termial by means of resistors 146 and 148. The emitter electrode of transistor 130 is directly connected to the power supply terminal 140.

The collector electrode of transistor 128 is coupled to the base electrode of transistor 126 by means of a capacitor 150 and to the anode electrode of the diode 134 by means of a resistor 152. The collector electrode of the transistor 126 is coupled to the base electrode of the transistor 128 by means of a capacitor 154 and to the base electrode of the transistor 130 by means of a resistor 156. The collector electrode of transistor 130 is coupled to a negative potential power supply terminal 158 by means of a resistor 160 and to the gate electrode 84' of the field effect transistor 114 by means of a resistor 162. The source electrode of the field effect transistor 114 is coupled to the swtich 94 and capacitor 96, see FIG. 1.

The one-shot monostable multivibrator 68' is a conventional circuit, and therefore its operation will not be described in detail. It functions to receive pulses from the pulse wheel 66', shape the pulses, so that they have a constant area, and apply them to the gate electrode 84' of the field effect transistor 114. The double pole, single throw switch 102 cooperates with the switch 116 to provide either a positive or negative potential to the drain electrode of the field effect transistor 114. For example, we have chosen the power supplies 104 and 106 and resistors 118, 120 and 122 such that a negative one volt potential is applied to the drain electrode of field effect transistor 114 when switch 116 is open, and a positive one volt potential is applied thereto when switch 116 is closed.

Thus it may be seen that the field effect transistor 114 serves as a gating element to pass either a +1 or −1 volt pulse to switch 94 and capacitor 96 in response to pulses applied to its gate electrode 84' by means of the pulse wheel 66' and the pulse shape circuitry 68'. Thus, the operation and results achieved by the pulse generating circuitry 17' are similar to that of the circuitry 17.

Many modifications and variations of the present invention are possible in light of the above teachngs. For example, the pulse wheel, rather than being mechanically controlled by an operator, may be actuated by means of a pulse train from a digital computer which is monitoring the process. It is therefore to be understood that the invention may be practiced otherwise than as specifically described.

We claim:

1. An electronic controller circuit for providing an electronic signal to control a process variable including:
   an electronic integrator circuit having an amplifier having an input and output terminal, and
   a combination resistance-capacitance network coupling said output terminal to said input terminal, the improvement comprising,
   pulse generating means for producing oposite polarity pulses electrically connected to the input terminals of said electronic integrator means, said opposite polarity pulse generating means being manually controllable to generate a selected number of pulses of a chosen polarity, and repetition rate,
   whereby manual manuipulation of said pulse generating means applies pulses of a chosen polarity and frequency to said integrator circuit to selectively control the voltage at said output terminal thereof.

2. The electronic controller circuit as defined in claim 1, wherein:
   the voltage ($v$)-pulse duration ($t$) product ($v \cdot t$) of each of said pulses applied to said input terminal of said integrator circuit is substantially constant.

3. The electronic controller as defined in claim 1, wherein said pulse generating means, comprises:
   multivibrator circuit means having input and output terminals and for providing, in response to a trigger signal applied to said input terminal, pulses having a substantially constant voltage ($v$)-pulse duration ($t$) product ($v \cdot t$) at said output terminal,
   pulse polarity-determining means, having a first and second input terminal and an output terminal, said first input terminal being connected to said output terminal of said multivibrator circuit means and said output terminal being electrically coupled to said amplifier input terminal,
   manually-controllable commutator means, electrically connected to said input terminal of said one-shot multivibrator circuit, for selectively applying trigger signals thereto, said commutator means further electrically connected to said second input terminal of said pulse polarity-determining means,
   whereby manual actuation of said commutation means controls both the polarity and frequency of pulses applied to said integrator circuit amplifier.

4. An electronic controller for providing an electronic signal to control a process variable, the controller including an integrator circuit having an input and an output terminal, the improvement comprising:
   pulse generating means for producing opposite polarity pulses electrcially connected to the input terminal of said integrator circuit, said opposite polarity pulse generating means being operable to generate a selected number of pulses of a chosen polarity and repetition rate,
   whereby said pulse generating means may be actuated to vary a control voltage provided at said output terminal thereof.

5. The electronic controller circuit as defined in claim 4, wherein:
   said pulse generating means is selectively connectable to the input terminal of said integrator circuit by means of a switch.

6. The electronic controller as defined in claim 5, wherein:
   the voltage ($v$)-pulse duration ($t$) product ($v \cdot t$) of each of said pulses applied to said input terminal of said integrator circuit is substantially constant.

7. An electronic analog controller for providing an electronic signal to control a process variable, comprising:
   means for comparing a first signal representative of a process variable with a second signal corresponding to a desired process set point, said comparing means providing an error signal corresponding to the difference between the value of process variable signal and the set point signal,
   a high-gain operational amplifier having an input terminal selectively coupled to receive the error signal from said comparing means, said operational amplifier including input and output terminals and a feedback circuit therebetween for providing at said output terminal an electronic signal proportional to the integral of the signal applied to said input terminal, pulse generating means for producing opposite polarity pulses, means for switching said input terminal of said amplifier from said comparing means to said pulse generating means, said pulse generating means being operable to generate a selected number of pulses of a chosen polarity and repetition rate, whereby said operational amplifier may be utilized to control the voltage at said output terminal in response to said pulses applied to its input terminal.

References Cited

UNITED STATES PATENTS

| | | | |
|---|---|---|---|
| 2,673,929 | 3/1954 | Huffman | 328—127 |
| 3,119,029 | 1/1964 | Russell | 328—127X |
| 3,290,562 | 12/1966 | Faulkner et al. | 328—127X |
| 3,363,157 | 1/1968 | Rouvalis | 318—22X |

ROY LAKE, Primary Examiner

J. B. MULLINS, Assistant Examiner

U.S. Cl. X.R.

307—229, 251, 267